2,813,849
Patented Nov. 19, 1957

2,813,849

THERMAL POLYMERIZATION OF ACRYLONITRILE, METHACRYLONITRILE, STYRENE, AND ALKYL METHACRYLATES, USING THIURAM DISULFIDES AS INITIATORS

Roland J. Kern, Miamisburg, Ohio, assignor to Monsanto Chemical Company, St. Louis, Mo., a corporation of Delaware No Drawing. Application November 8, 1955,
Serial No. 545,788

16 Claims. (Cl. 260—88.7)

This invention relates to the thermal polymerization of acrylonitrile, methacrylonitrile, styrene, and the lower alkyl methacrylates. In specific aspects the invention pertains to new thermal initiators for the polymerization of acrylonitrile, methacrylonitrile, styrene, and the lower alkyl methacrylates.

This application is a continuation-in-part of my application, Serial No. 353,912, filed May 8, 1953, now abandoned.

In accordance with this invention, one or more of the monomers acrylonitrile, methacrylonitrile, styrene, and the lower alkyl methacrylates, are polymerized by heating in the presence of small but catalytic amounts of a thiuram disulfide. Preferred thermal initiators of the present invention can be represented by the structural formula:

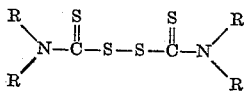

wherein each R is alkyl or two R's attached to a single nitrogen taken together consist of a pentamethylene group forming with the N a piperidinium group; it will be understood that each R can be the same as or different from other R's. While the foregoing are preferred, the invention in its broader aspects includes the use of any thiuram disulfide effective to increase the rate of polymerization of a monomer of the class described. Thus, it will be apparent that compounds of the structural formula as defined and related compounds wherein one or more of the R's is substituted by a non-interfering group, i. e., a group which does not prevent the desired initiation of thermal polymerization of the monomers named, can be employed. Among groups that are usually non-interfering can be mentioned by way of example: halogen, aryl, cycloalkyl, alkoxy. Likewise, where two R's and the nitrogen to which they are attached taken together form a piperidinium group the same can be substituted with non-interfering groups, including those mentioned above and others, e. g., alkyl. Where any R is alkyl it can have a straight chain or a branched chain configuration; preferred alkyl groups contain from 1 to 6 carbon atoms. It will be apparent that in a given thiuram disulfide all R's can be the same or different R's can exist in the same compound. However, because of convenience in synthesis, ordinarily all R's will be the same. As specific examples of constituents that are normally non-interfering and that can be substituted on the R's of a thiuram disulfide of the structural formula given can be mentioned methyl, isobutyl, chloro, bromo, cyclohexyl, methylcyclopentyl, butoxy, naphthyl, benzyl, phenyl, tolyl. Among the numerous thiuram disulfides, the following are mentioned by way of example and not limitation:

N,N'-dipentamethylenethiuram disulfide
Tetramethylthiuram disulfide (known commercially as "Thiurad")
Tetraethylthiuram disulfide (this compound can also be named bis-(diethylthiocarbamyl) disulfide)
bis-[Di($\beta$-chloroethyl)thiocarbamyl] disulfide
Tetraisopropylthiuram disulfide
bis-(Benzylmethylthiocarbamyl) disulfide The action of thiuram disulfides towards thermal initiation of polymerization is very specific. Thus, for example, while tetramethylthiuram disulfide (foregoing structural formula wherein each R is methyl) is an active thermal initiator (catalyst) towards acrylonitrile, methacrylonitrile, styrene, and the lower alkyl methacrylates, it inhibits the thermal polymerization of methyl acrylate and does not initiate the thermal polymerization of vinyl acetate. It may be mentioned that the thermal initiation of styrene is outstanding, in that thermal polymerization of styrene is inhibited by most sulfur compounds that act as initiators towards thermal polymerization of other monomers. It can also be pointed out that the disulfides in general show no thermal initiating ability, or at the most only slight thermal initiating ability and this only on prolonged heating, and among these can be mentioned phenyl, tolyl, benzyl, benzhydryl, alkyl, and morpholine disulfides.

By the term "lower alkyl methacrylates," I include, for example, methyl methacrylate, ethyl methacrylate, isopropyl methacrylate, n-propyl methacrylate, n-butyl methacrylate, sec.-butyl methacrylate, tert.-butyl methacrylate, isobutyl methacrylate and the various amyl and hexyl methacrylates in particular, although other lower alkyl methacrylates containing a greater number of carbon atoms, for example up to 8 or 10 carbon atoms in the alkyl group, fall within the broad scope of the invention.

The invention is effected by heating one of the monomers discussed herein, or a mixture of two or more of the monomers discussed herein, in the presence of a small but catalytic amount of a thiuram disulfide effective to increase the rate of polymerization of the monomeric material, said thiuram disulfide being the sole polymerization catalyst present. The material need only be heated to a temperature sufficient to obtain a desired polymerization rate, and this temperature is preferably in the neighborhood of 100° C., for example 75° C. to 125° C. Ordinarily a temperature of above 50° C. is used to obtain useful polymerization rates. There is no particular upper limit on the polymerization temperature other than that dictated by the necessity of avoiding decomposition of monomer and/or polymer, keeping in mind that in general the higher the temperature the lower the molecular weight of the resultant polymer. Usually temperatures chosen will not exceed 150° C. to 175° C.

While the polymerization is often conducted in mass, i. e., in a system wherein the only components of the reaction mixture are the monomer (or monomers) plus the thiuram disulfide initiator, the invention is more broadly applicable to all types of polymerization techniques. For example, an added organic solvent for monomer and/or polymer can be present, such as benzene, ethanol, acetone, toluene. Further, the polymerization can be effected by the well-known suspension or emulsion techniques. In the former the monomeric material, preferably already containing the thiuram disulfide compound chosen as initiator, is suspended in the form of small particles in a non-solvent liquid, such as water, an added suspending agent such as starch, carboxymethylcellulose, phosphates, vinyl acetate/maleic anhydride copolymer, or the like being present to aid in maintaining the particles separate one from another; during the polymerization the particles tend to grow in size. Emulsion polymerization is similar with the exception that added emulsifying agents are used and the particle size is much smaller so that a stable aqueous emulsion of polymer is the end product of the polymerization. In this instance also it is preferred to dissolve the thiuram disulfide initiator in the monomeric material prior to emulsifying the same. Suitable emulsifying agents are sodium or potassium fatty acid soaps, sodium alkaryl sulfonates, and non-ionic emulsifiers such as condensation products of ethylene oxide with tertiary alkyl mercaptans.

Often 0.01 weight percent of the thermal initiator, based on the weight of monomeric material present, is ample. Almost always, 0.1 weight percent will be sufficient to obtain a good polymerization rate when the polymerizing mixture is heated to a suitable temperature. More than this quantity is seldom if ever necessary, although more, say up to 1 to 5 percent can be used, if desired.

The purity of monomer may have a marked effect upon the polymerization rate. Thus, it is ordinarily preferred that the polymerization be effected with freshly distilled monomer, and also in the absence of air. Various thiuram disulfides will differ in the extent to which they are affected by monomer purity, choice of monomer, and conditions of reaction. The invention encompasses the use of those thiuram disulfides effective to increase the rate of thermal polymerization of a given monomeric material of the class described herein with a suitable combination of reaction conditions, including monomer purity and quantity of thiuram disulfide. Those skilled in the art, having been given the benefit of the present disclosure, will recognize that the principles of the invention may be applicable to polymerization of monomers closely related to acrylonitrile, methacrylonitrile, styrene, and the lower alkyl methacrylates, containing groups that do not interfere with the desired thermal polymerization.

The following examples illustrate some preferred aspects of the invention but are not to be taken as exhaustive of the broad scope thereof.

*Example 1*

Thermal polymerization tests were made by sealing under nitrogen in a Pyrex glass tube 20 ml. of the chosen monomer, together with 0.02 gram of tetramethylthiuram disulfide. With each monomer a blank was run in which the same quantity of monomer was sealed in the tube without any added tetramethylthiuram disulfide. The tubes were then maintained at 95° C. for a period of time that varied with the different monomers in accordance with previous experience indicating a desirable time for tests of this nature.

After the given polymerization period each tube was opened, the weighed contents precipitated in excess methanol, filtered, washed with methanol, dried, and weighed again to determine the amount of polymer formed, whereby the weight percent of monomer charged that had been converted to polymer was obtained.

Results are given in the following table.

| Monomer | Time, hours | Conversion Weight, Percent | |
| --- | --- | --- | --- |
| | | Blank | Initiated |
| Acrylonitrile | 16 | 0 | 8 |
| Methacrylonitrile | 24 | 2 | 16 |
| Styrene | 8 | 14 | 48 |
| Methyl acrylate | 3 | 95 | 20 |
| Vinyl acetate | 24 | 0 | 0 |

*Example 2*

Thermal polymerization tests were made by the general procedure of Example 1. The monomer (15 cc.) and the tetramethylthiuram disulfide (0.0004 mole) were sealed under nitrogen in a Pyrex tube. These tubes were wrapped to protect from light and then shaken until the tetramethylthiuram disulfide had dissolved. The thermally activated polymerizations were carried out at 95° C. in a light-protected bath in which the tubes were not agitated. Blanks (monomer only) were run in the same manner.

After the indicated times, tube contents were diluted or dissolved in benzene or acetone and precipitated in methanol. Precipitates were filtered, washed with methanol and dried. Vinyl acetate runs were poured into hexane for precipitation of any polymer that might have been formed, while polyacrylonitrile was merely diluted and washed with methanol but not solvent purified.

Specific viscosities at 1 gram of polymer per liter of indicated solvent were determined at 25° C.

Results are given in the following table.

| | Time (hrs.) | Conversion (Wt. Percent) | | Specific Viscosity | |
| --- | --- | --- | --- | --- | --- |
| | | Blank | Initiated | Blank | Initiated |
| Acrylonitrile | 18 | 0 | 10 | | a .05 |
| Methacrylonitrile | 48 | 1 | 38 | b .32 | b .03 |
| Methyl acrylate | 18 | (d) | 17 | | b 0.04 |
| Methyl methacrylate | 3 | 0 | 38 | | |
| Styrene | 12 | 39 | 80 | c .18 | c .10 |
| Vinyl acetate | 72 | 0 | 0 | | | a 0.1% in dimethylformamide.
b 0.1% in acetone.
c 0.1% in toluene.
d Cross-linked gel; high conversion.

*Example 3*

The catalytic effect, if any, of a variety of organic disulfides in the thermal polymerization of acrylonitrile, was determined by tests similar to those described in Examples 1 and 2 above.

To 14 cc. of freshly distilled acrylonitrile was added 0.05 gram of the indicated compound. The mixture was sealed under nitrogen in a Pyrex glass tube and heated in a water bath at 95° C. for the indicated times. The tube was protected from the action of light during the heating. The sample designated "blank" contained no added compound and consisted solely of acrylonitrile. Extent of polymerization was determined by visual observation.

| Compound | Appearance | |
| --- | --- | --- |
| | After 24 hrs. | After 90 hrs. |
| Blank | No change | No change. |
| Phenyl disulfide | do | Not tested. |
| p-Tolyl disulfide | do | Slight haze. |
| Benzyl disulfide | do | No change. |
| n-Butyl disulfide | do | Do. |
| Benzhydryl disulfide | Some flocculent white precipitate.a | Solid, white. |
| Morpholine disulfide (4,4'-dithiodimorpholine) | Some flocculent brown precipitate.a | Soft tan solid. | a Less than 1% conversion to polymer.

The foregoing results show that none of these disulfide compounds acted as initiator or catalyst for the thermal polymerization of acrylonitrile, other than the last two compounds, which caused a trace of polymerization in 24 hours and definite polymerization in 90 hours.

While the invention has been described herein with particular reference to various preferred embodiments thereof, it will be appreciated that numerous modifications and variations are possible without departing from the invention.

I claim:

1. A polymerization process which comprises heating a polymerizable monomer consisting of a compound selected from the group consisting of acrylonitrile, methacrylonitrile, styrene, and the alkyl methacrylates wherein the alkyl group contains from 1 to 10 carbon atoms in the presence of, as the sole polymerization catalyst, small but catalytic amounts of a thiuram disulfide compound having the structural formula:

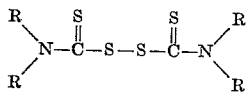

and selected from the group consisting of such compounds wherein each R is alkyl containing from 1 to 6 carbon atoms and such compounds wherein two R's attached to a single nitrogen taken together consist of a pentamethylene group forming with the N a piperidinium group.

2. A process according to claim 1 wherein said thiuram disulfide compound is employed in an amount within the range of 0.01 to 0.1 weight percent of the monomer.

3. A process according to claim 1 wherein said heating is effected at a temperature above 50° C.

4. A process according to claim 1 wherein said polymerization is effected in mass.

5. A process according to claim 1 wherein said polymerization is effected in an aqueous medium.

6. A process according to claim 1 wherein said thiuram disulfide compound is tetramethylthiuram disulfide.

7. A process according to claim 1 wherein said thiuram disulfide compound is tetraethylthiuram disulfide.

8. A process according to claim 1 wherein said thiuram disulfide compound is N,N'-dipentamethylenethiuram disulfide.

9. A process according to claim 1 wherein said monomer is acrylonitrile.

10. A process according to claim 1 wherein said monomer is methacrylonitrile.

11. A process according to claim 1 wherein said monomer is styrene.

12. A process according to claim 1 wherein said monomer is methyl methacrylate.

13. A process which comprises subjecting a polymerizable monomer consisting of acrylonitrile to thermal polymerization in the presence of small but catalytic amounts of tetramethylthiuram disulfide as the sole polymerization catalyst present.

14. A process which comprises subjecting a polymerizable monomer consisting of methacrylonitrile to thermal polymerization in the presence of small but catalytic amounts of tetramethylthiuram disulfide as the sole polymerization catalyst present.

15. A process which comprises subjecting a polymerizable monomer consisting of styrene to thermal polymerization in the presence of small but catalytic amounts of tetramethylthiuram disulfide as the sole polymerization catalyst present.

16. A process which comprises subjecting a polymerizable monomer consisting of methyl methacrylate to thermal polymerization in the presence of small but catalytic amounts of tetramethylthiuram disulfide as the sole polymerization catalyst present.

References Cited in the file of this patent
UNITED STATES PATENTS 2,385,190    Browning  ------------  Sept. 18, 1945